United States Patent [19]

Sebald

[11] 4,102,291
[45] Jul. 25, 1978

[54] ELECTRICAL GENERATOR FOR A SAILBOAT

[76] Inventor: Ralf Sebald, Vorhoelzerstrasse 3, 8000 Munich 71, Fed. Rep. of Germany

[21] Appl. No.: 728,010

[22] Filed: Sep. 29, 1976

[30] Foreign Application Priority Data

Oct. 7, 1975 [DE] Fed. Rep. of Germany ....... 2544939

[51] Int. Cl.² .......................... B63G 8/42; F03B 13/10
[52] U.S. Cl. ........................................ 114/244; 290/54
[58] Field of Search .............. 114/244, 245; 115/18 E, 115/17, 24; 290/53–55; 73/185, 231 R; 322/35

[56] References Cited

U.S. PATENT DOCUMENTS

| 486,684 | 11/1892 | Salisbury | 115/18 E |
|---|---|---|---|
| 1,061,309 | 5/1913 | McQuown | 73/185 |
| 1,898,973 | 2/1933 | Lansing | 290/54 |
| 1,952,341 | 3/1934 | Ude | 115/18 E |
| 3,081,251 | 3/1963 | Spector | 290/54 |
| 3,371,362 | 3/1968 | Butler | 115/17 |
| 3,619,632 | 11/1971 | Labombarde | 290/54 |

FOREIGN PATENT DOCUMENTS 2,278,941  2/1976  France ................ 290/54

Primary Examiner—Trygve M. Blix
Assistant Examiner—Stuart M. Goldstein
Attorney, Agent, or Firm—Michael J. Striker

[57] ABSTRACT

A sailboat is provided with an electrical generator that is connected to its on-board battery. A propeller immersed in the water is connected via a flexible shaft to the input of this generator so that as the sailboat moves through the water the propeller is rotated to drive the generator and charge the battery. The arrangement may be taffrail mounted so that the propeller is towed or the flexible shaft may extend through a fitting in the hull via a water-tight sleeve.

7 Claims, 5 Drawing Figures

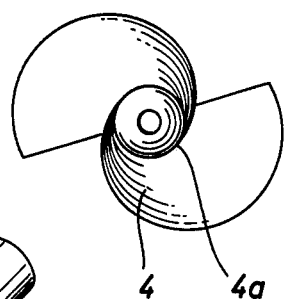
FIG. 3
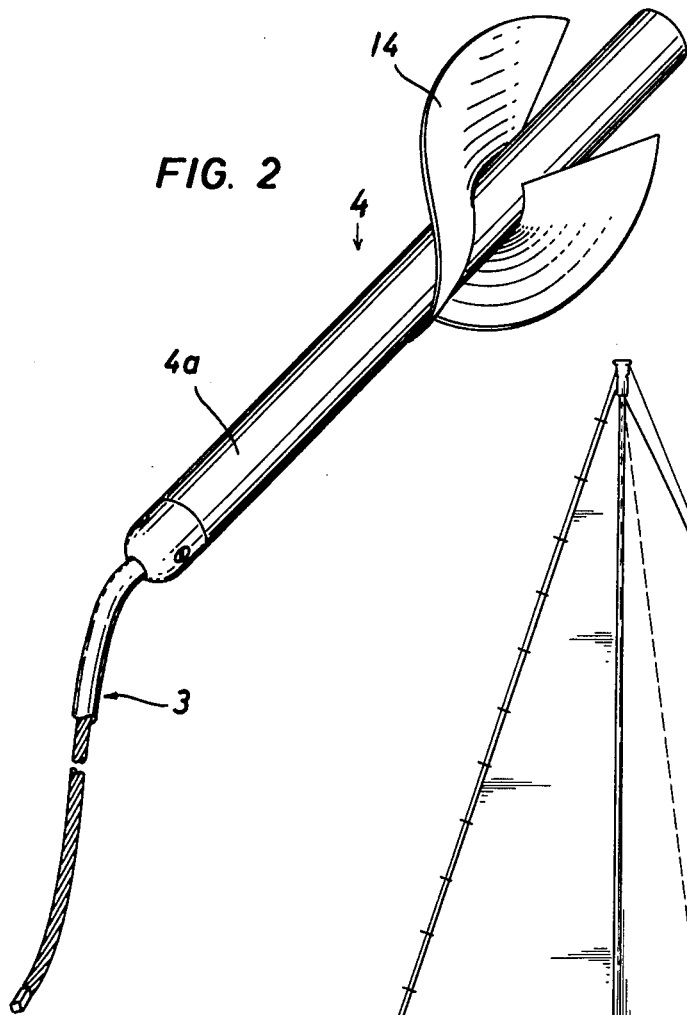
FIG. 2
FIG. 5
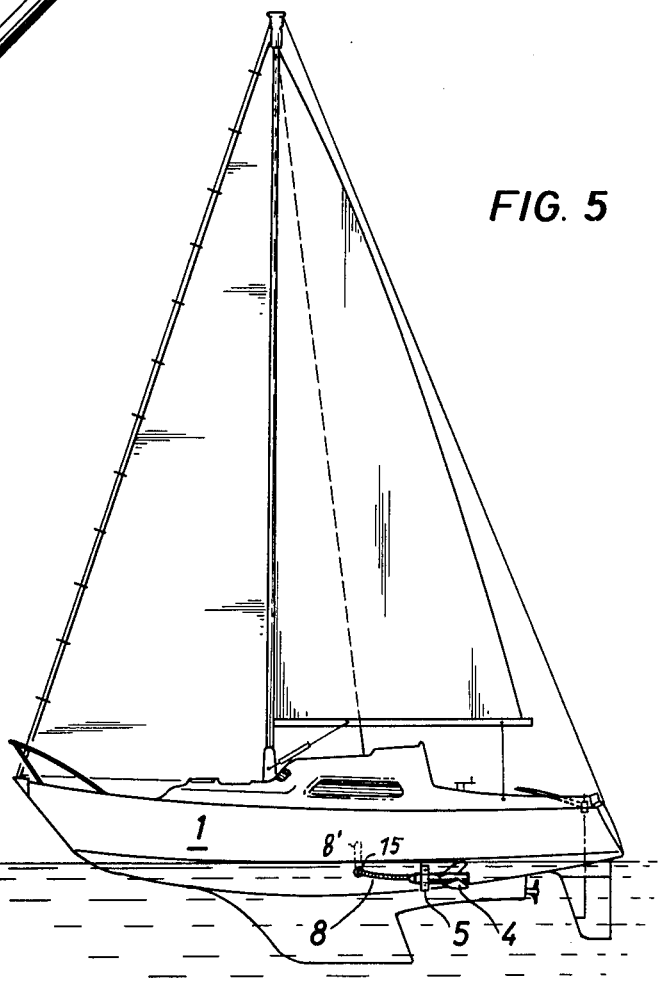

ELECTRICAL GENERATOR FOR A SAILBOAT

BACKGROUND OF THE INVENTION

The present invention relates to an electrical generator for a sailboat. More particularly this invention concerns such a generator which employs the motion of the sailboat through the water in order to generate electricity.

A sailboat is frequently provided with a substantial quantity of electronic and electrical equipment, such as radios, lights, refrigeration equipment, and miscellaneous marine instrumentation devices. This equipment is all powered normally by the on-board ship's battery.

A constant problem for the operator of such sailboat is keeping this battery charged so that all the above-mentioned equipment can be used. Normally this is simply done by running the auxiliary engine periodically. A generator on this engine is connected to the battery and charges it. Such periodic running of the auxiliary engine is not only a bother and tends to wear out the engine, but also destroys the tranquility of the sail and often consumes a disproportionately large amount of fuel. Since the battery is normally rather large, in the 100 or 200 ampere-hour size, the charging operation takes a relatively long time also. Furthermore, it is noted that in some locations running of the engine is not only discouraged but virtually illegal except in emergency circumstances.

It has been suggested to employ a windmill-type device to generate electricity on a sailboat. Obviously, such an arrangement will not work at all in a dead run, and at best can only be counted on the produce a very minimal amount of electricity. The use of solar cells has similarly proven itself impractical.

In yet another solution the propeller of the auxiliary engine on the sailboat can be uncoupled from this engine but left coupled with the on-board generator. Thus as the ship is moving through the water under sail power the water moving relative to the ship will rotate this propeller and the generator and allow the battery to be trickle charged. This system has also been proven to be extremely inefficient, as the propeller, which is designed to drive the boat through the water using several horsepowers of torque is very inefficient when used in reverse fashion to drive the generator. Indeed often the friction in the stuffing box alone is so great as to use up most of the work created by rotation of the propeller by means of the water through which the boat is passing.

SUMMARY OF THE INVENTION

It is therefore an object of the present invention to provide an improved electricity-generating system for a sailboat.

Another object is to provide such an arrangement which uses the relative movement of the boat in the water to generate electricity.

Yet another object is to provide such an arrangement which allows the on-board ship's battery to be trickle-charged sufficiently during good sailing as to eliminate the need for occasionally running the auxiliary engine.

These objects are attained according to the present invention in a combination with a sailboat comprising an electrical generator on the sailboat and having an input operable for generating electricity, a propeller immersible in the water adjacent the sailboat, and a flexible shaft extending between the propeller and the generator. Thus when the sailboat is displaced through the water the propeller is rotated by the water and thereby rotates the input or rotor of the generator so as to generate electricity for the sailboat.

According to another feature of this invention the device may be at least partially mounted on the taffrail of the sailboat so that the propeller is dragged behind the stern of the sailboat in the water. Such an arrangement allows the device very simple to be mounted on an existing sailboat without having to substantially redesign or restructure any part of this boat. The propeller is formed much like the rotator for a log, and has a sinker on it that insures that the flexible shaft, formable by a steel cable, remains relatively straight with the propeller below the waterline.

In accordance with another feature of this invention the shaft extends through the hull of the boat and has a sleeve connected in watertight fashion to the hull of the boat and having an inside end well above the water line, taking into account heeling of the boat. This sleeve is traversed by a steel core whose outer end carries the propeller and is arranged to lie generally parallel to the normal direction of travel of the boat. Furthermore, a bracket may be fitted to the hull of the boat below the waterline and may serve as the journal for the propeller. In this arrangement the flexible shaft and the propeller are arranged so as to be readily removable when the ship is at anchor or enters a harbor in order to prevent snagging.

According to yet a further feature of this invention the ship has a battery connected to the generator so that this battery is trickle-charged as the boat moves through the water. It is possible to provide a voltage regulator between the generator and the battery and/or a regulatable transmission between the generator and the shaft in order to prevent overcharging of the battery or charging at too fast a rate.

It is possible according to this invention to make the shaft fully salt-water resistant. This is most easily done by forming the shaft of a stainless-steel cable. When the shaft passes through the hull a steel-cable shell or sleeve around a core constituting the shaft may be covered with a synthetic-resin waterproof coating. In such an arrangement a steel of V4A type is best used according to this invention.

With this system it is therefore possible when the sailboat is moving at a speed greater than 3 knots to generate sufficient electricity to keep the on-board ship's battery fully charged. The small loss in cruising speed is more than compensated for by the possibility of not having periodically to operate the ship's auxiliary engine.

In an arrangement where the generator is taffrail-mounted the ship end or inner end of the flexible cable can be uncoupled from this generator to allow the shaft constituted by the cable and the propeller to be pulled in. This may even be done while under full sail so that when moving into a harbor or the like the generating arrangement can be brought out of service without interfering with other operation of the ship.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a perspective view of the propeller with the flexible shaft according to this invention;

FIG. 3 is an end view of the propeller of FIG. 2;

FIG. 5 is a view similar to FIG. 1 illustrating another arrangement according to this invention.

SPECIFIC DESCRIPTION OF PREFERRED EMBODIMENTS

Figure 1:
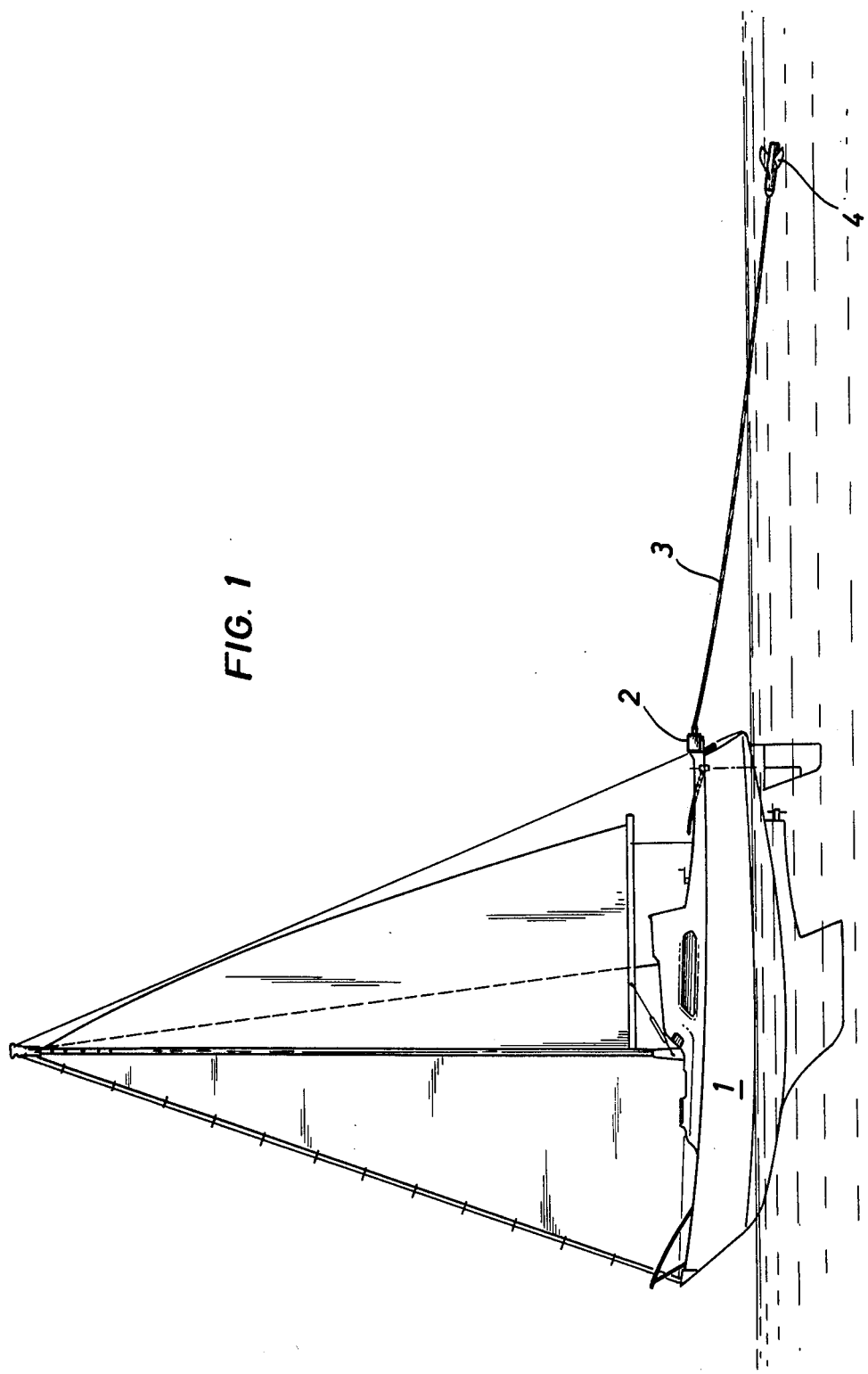
FIG. 1 is a side view of the combination according to this invention.
Figure 4:
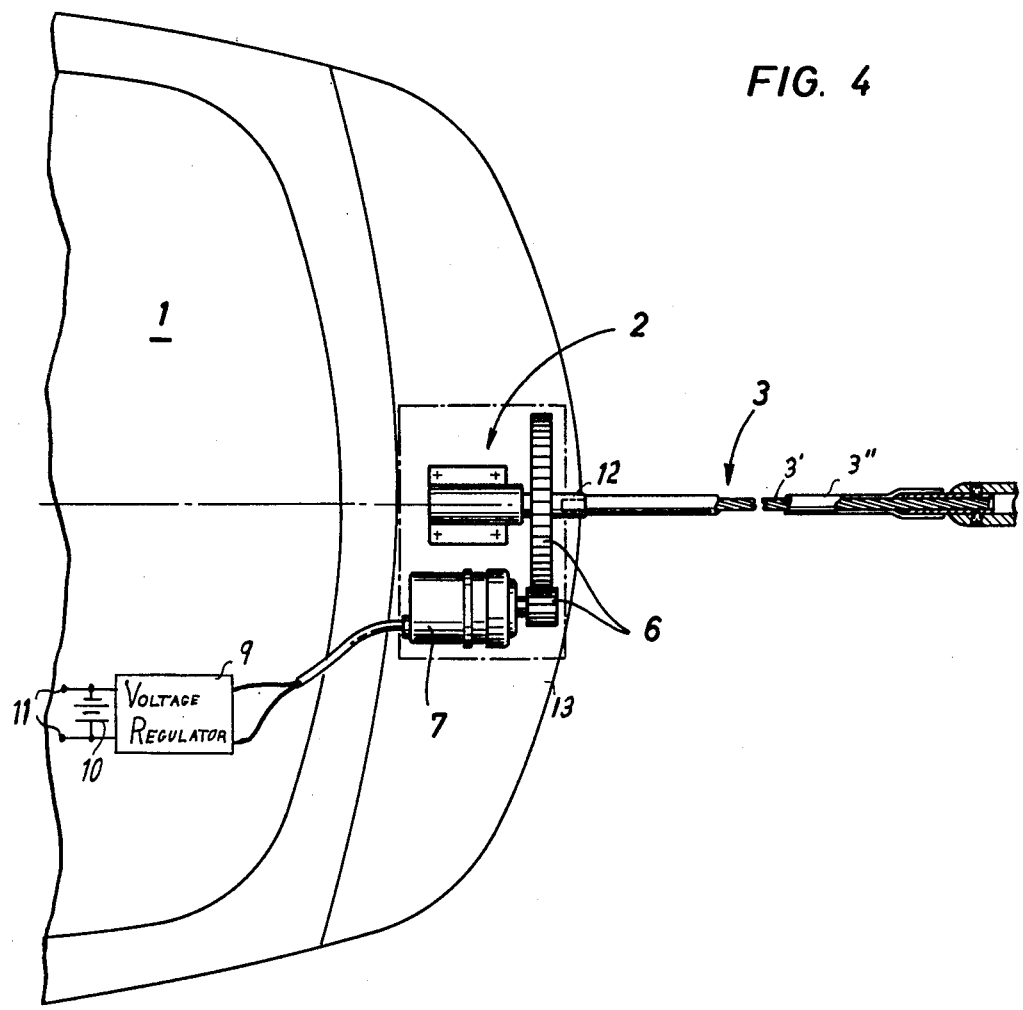
FIG. 4 is a top view of the arrangement shown in FIG. 1.

As shown in FIGS. 1 – 4 a sailboat 1, here a cruising sloop, is provided at its taffrail 13 with a generator assembly 2 to which is connected via a releasable coupling 12 a flexible shaft 3 at whose rear end, relative to the normal direction of travel of the boat 1, is a propeller 4. This propeller 4 shown in detail in FIGS. 2 and 3, is of the type used as a rotator for a log and has a pair of vanes 14 and a body 4a. The body 4a is formed as a sinker and is connected via a clamp to the rear end of the cable 3.

This cable 3 comprises a stainless-steel wire core 3' formed of V4A wire and a synthetic-resin sheath 3" of a polyamide such as nylon surrounding it.

The generator assembly 2 has a speed-increasing transmission 6 whose output is connected to the input or rotor side of a generator 7 connected through a voltage regulator 9 to a ship's battery 10 having a pair of terminals 11 to which are connected the various electrical and electronic devices of the ship.

In use the coupling 12 is hooked up and the shaft 3 with the propeller 4 are thrown off the stern of the boat 1. As the boat 1 moves through the water the propeller 4 will be rotated and this rotation will be transmitted through the cable 3 and the transmission 6 to the generator 7. Sufficient electricity can be generated under normal cruising speed to trickle-charge the battery 11 and completely eliminate the necessity of running the on-board auxiliary engine.

It is also possible as shown in FIG. 5 to provide the shaft 3 in a flexible sleeve 8 extending through the hull of the ship via a through-hull fitting 15 and having an inner end 8' which lies above the waterline, taking into account heeling of the boat 1. In addition a bracket 5 is provided in which the propeller 4 is journalled so that this propeller 4 is maintained strictly in line with the direction of displacement of the boat 1. The propeller 4 can readily be removed from the hull of the boat 1 for maneuvering in a harbor or in close quarters.

The transmission 6 is so set up that the generator 7 is operated at its optimum speed. Since the boat speed typically does not exceed 7 or 8 knots, this allows the generator to be operated in a range that gives a good charging level for the battery 10. When in a large boat the speed rises to as much as 12 knots, the transmission 6 must be reconstructed or adjusted.

It is possible to thoroughly grease the sleeve 8 so that leakage back into the boat is almost impossible and free turning of this shaft 3 is facilitated. Furthermore, all of the wetted parts of the assembly are of stainless steel or similar salt-water resistant materials.

It will be understood that each of the elements described above, or two or more together, may also find a useful application in other types of assembly differing from the types described above.

While the invention has been illustrated and described as embodied in a generator for a sailboat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. The combination comprising:
    a sailboat displaceable through the water and having a hull partially above and partially below the waterline;
    an electrical generator on said sailboat having an input operable for generating electricity;
    a propeller immersible in the water;
    a bracket mounted on said hull below said waterline;
    a hollow sleeve passing in watertight fashion through said hull between said generator and said propeller and through a location above said waterline; and
    a core rotatable in and passing through said sleeve, said core having an inner end connected to said input and an outer end journaled in said bracket for rotation about an axis generally parallel to the normal direction of movement of said sailboat through the water and connected to said propeller, whereby on displacement of said sailboat the water rotates said propeller and thereby rotates said input to generate electricity.

2. The combination defined in claim 1 wherein said propeller is provided with a sinker.

3. The combination defined in claim 1 wherein said sleeve is of steel wire and said core is another steel wire, said combination further comprising a lubricant between said core and said sleeve.

4. The combination defined in claim 1, further comprising a battery on said sailboat connected to said generator.

5. The combination defined in claim 1, further comprising a releasable coupling between said core and said generator.

6. The combination defined in claim 1, further comprising a transmission between said core and said generator.

7. The combination defined in claim 1 wherein said propeller has at least one blade and is so constructed and adapted as to maintain said core generally straight during displacement of said sailboat through the water.

* * * * *